US008851976B2

(12) United States Patent
Chan et al.

(10) Patent No.: US 8,851,976 B2
(45) Date of Patent: Oct. 7, 2014

(54) WAGERING GAME WITH GAME ENHANCEMENT FEATURE

(75) Inventors: Jason W. Chan, Chicago, IL (US); Benjamin T. Gomez, Chicago, IL (US); Daniel P. Louie, Chicago, IL (US); Pamela S. Smith, Chicago, IL (US); Jamie W. Vann, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 189 days.

(21) Appl. No.: 13/440,295

(22) Filed: Apr. 5, 2012

(65) Prior Publication Data

US 2012/0258783 A1 Oct. 11, 2012

Related U.S. Application Data

(60) Provisional application No. 61/472,897, filed on Apr. 7, 2011.

(51) Int. Cl.
*A63F 13/00* (2014.01)
*G07F 17/34* (2006.01)

(52) U.S. Cl.
CPC .................................. *G07F 17/34* (2013.01)
USPC .................... 463/24; 463/20; 463/25; 463/29

(58) Field of Classification Search
CPC ............ G07F 17/3244; G07F 17/3262; G07F 17/3267
USPC .......................................... 463/20, 24, 25, 29
See application file for complete search history.

(56) References Cited

U.S. PATENT DOCUMENTS

| | | | | |
|---|---|---|---|---|
| 6,033,307 | A * | 3/2000 | Vancura | 463/20 |
| 6,375,187 | B1 | 4/2002 | Baerlocher | 273/143 R |
| 6,506,118 | B1 | 1/2003 | Baerlocher et al. | 463/25 |
| 6,569,015 | B1 | 5/2003 | Baerlocher et al. | 463/16 |
| 6,599,192 | B1 | 7/2003 | Baerlocher et al. | 463/25 |
| 6,632,141 | B2 | 10/2003 | Webb et al. | 463/25 |
| 6,648,754 | B2 | 11/2003 | Baerlocher et al. | 463/17 |
| 6,663,489 | B2 | 12/2003 | Baerlocher | 463/20 |
| 6,692,355 | B2 | 2/2004 | Baerlocher et al. | 463/16 |
| 6,719,632 | B2 | 4/2004 | Palmer et al. | 463/25 |
| 6,758,750 | B2 | 7/2004 | Baerlocher et al. | 463/25 |
| 6,793,579 | B2 | 9/2004 | Baerlocher et al. | 463/25 |
| 6,796,905 | B2 | 9/2004 | Baerlocher et al. | 463/25 |
| 6,808,452 | B2 | 10/2004 | Baerlocher et al. | 463/17 |
| 6,811,483 | B1 | 11/2004 | Webb et al. | 463/16 |
| 6,852,030 | B2 | 2/2005 | Baerlocher et al. | 463/25 |
| 6,890,257 | B2 | 5/2005 | Baerlocher | 463/25 |
| 7,004,835 | B2 | 2/2006 | Baerlocher | 463/16 |

(Continued)

*Primary Examiner* — Damon Pierce
(74) *Attorney, Agent, or Firm* — Nixon Peabody LLP

(57) ABSTRACT

A gaming system includes at least one memory device that stores instructions that cause a processor to operate with a display device an input device to display a wagering game having a basic game and a bonus game having a first end-game outcome, trigger a first instance of the bonus game during play of the basic game, provide a first number of award opportunities during play of the first instance of the bonus game, complete the first instance of the bonus game in response to the first end-game outcome, store any remaining award opportunities in the at least one memory device in response to the first end-game outcome being achieved with at least one award opportunity remaining, trigger a second instance of the bonus game during play of the basic game, and provide any stored remaining award opportunities during play of the second instance of the bonus game.

20 Claims, 5 Drawing Sheets

(56) References Cited

U.S. PATENT DOCUMENTS

| | | | | |
|---|---|---|---|---|
| 7,040,984 | B2 | 5/2006 | Mead | 463/16 |
| 7,326,109 | B2 | 2/2008 | Baerlocher | 463/16 |
| 2002/0142822 | A1 | 10/2002 | Baerlocher et al. | 463/16 |
| 2003/0040360 | A1 | 2/2003 | Kaminkow | 463/25 |
| 2003/0045344 | A1 * | 3/2003 | Webb et al. | 463/20 |
| 2003/0064795 | A1 | 4/2003 | Baerlocher et al. | 463/25 |
| 2003/0078093 | A1 | 4/2003 | Simms et al. | 463/20 |
| 2003/0162578 | A1 | 8/2003 | Baerlocher et al. | 463/16 |
| 2003/0162583 | A1 * | 8/2003 | Baerlocher et al. | 463/20 |
| 2003/0162584 | A1 | 8/2003 | Hughs-Baird et al. | 463/20 |
| 2003/0176215 | A1 | 9/2003 | Palmer et al. | 463/25 |
| 2003/0211880 | A1 | 11/2003 | Locke | 463/20 |
| 2003/0224846 | A1 | 12/2003 | Baerlocher | 463/16 |
| 2004/0162128 | A1 | 8/2004 | Baerlocher et al. | 463/16 |
| 2004/0180710 | A1 | 9/2004 | Palmer et al. | 463/16 |
| 2004/0242302 | A1 | 12/2004 | Baerlocher | 463/16 |
| 2005/0020342 | A1 | 1/2005 | Palmer et al. | 463/16 |
| 2005/0054413 | A1 | 3/2005 | Randall et al. | 463/16 |
| 2005/0055115 | A1 | 3/2005 | Gerrard et al. | 700/91 |
| 2005/0101375 | A1 | 5/2005 | Webb et al. | 463/25 |
| 2006/0058097 | A1 * | 3/2006 | Berman et al. | 463/20 |
| 2006/0063585 | A1 * | 3/2006 | Cuddy | 463/20 |
| 2006/0068884 | A1 * | 3/2006 | Baerlocher et al. | 463/20 |
| 2007/0010316 | A1 * | 1/2007 | Baerlocher et al. | 463/20 |
| 2009/0104977 | A1 * | 4/2009 | Zielinski | 463/25 |
| 2010/0016055 | A1 * | 1/2010 | Englman | 463/20 |

* cited by examiner

WAGERING GAME WITH GAME ENHANCEMENT FEATURE

CROSS-REFERENCE To RELATED APPLICATION

This application claims the benefit of priority to U.S. Provisional Patent Application No. 61/472,897, filed Apr. 7, 2011, which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus and methods for playing wagering games and, more particularly, to wagering games having an enhancement feature that includes carry over or deferment of at least one award opportunity from one bonus game to another bonus game.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

One concept that has been successfully employed to enhance the entertainment value of a game is the concept of a "secondary event" or "bonus game" that may be played in conjunction with a "basic" game. The secondary event may comprise any type of game, either similar to or completely different from the basic game, which is entered upon the occurrence of a selected event or outcome in the basic game. Generally, secondary events provide a greater expectation of winning than the basic game and may also be accompanied with more attractive or unusual video displays and/or audio. Secondary events may additionally award players with "progressive jackpot" awards that are funded, at least in part, by a percentage of coin-in from the gaming machine or a plurality of participating gaming machines. Because the secondary event concept offers tremendous advantages in player appeal and excitement relative to other known games, and because such games are attractive to both players and operators, there is a continuing need to develop gaming machines with new types and uses of secondary events to satisfy the demands of players and operators.

SUMMARY OF THE INVENTION

According to one aspect of the present invention, a gaming system for conducting includes at least one input device, at least one display device, and at least one processor. The gaming system further includes at least one memory device that stores a plurality of instructions which, when executed by the at least one processor, cause the at least one processor to operate with the at least one display device and the at least one input device to display a wagering game having a basic game and a bonus game, the bonus game having a first end-game outcome, trigger a first instance of the bonus game during play of the basic game, provide a first number of award opportunities during play of the first instance of the bonus game, complete the first instance of the bonus game in response to the first end-game outcome, store any remaining award opportunities in the at least one memory device in response to the first end-game outcome being achieved with at least one award opportunity remaining, trigger a second instance of the bonus game during play of the basic game, and provide any stored remaining award opportunities during play of the second instance of the bonus game.

According to another aspect of the invention, a computer-implemented method in a gaming system includes receiving a wager via at least one input device to play a wagering game, the wagering game including a basic game and a bonus game, the bonus game having a first end-game outcome. The computer-implemented method further includes displaying on at least one display device the basic game and a first and second instance of the bonus game triggered during play of the basic game. The computer-implemented method further includes awarding, via one or more processors, a first number of award opportunities during play of the first instance of the bonus game. The computer-implemented method further includes completing the first instance of the bonus game in response to the first end-game outcome occurring during the first instance of the bonus game. The computer-implemented method further includes storing, utilizing at least one memory device, any remaining award opportunities in response to the first end-game outcome being achieved with at least one award opportunity remaining The computer-implemented method further includes providing any stored remaining award opportunities during play of the second instance of the bonus game.

According to another aspect of the invention, one or more machine-readable storage media include instructions which, when executed by one or more processors, cause the one or more processors to perform operations. The operations include displaying a wagering game having a basic game and a bonus game, the bonus game having an end-game outcome, triggering a first instance of the bonus game during play of the basic game, providing a first number of award opportunities during play of the first instance of the bonus game, and completing the first instance of the bonus game in response to the end-game outcome. The operations further include storing any remaining award opportunities in response to the end-game outcome being achieved with at least one award opportunity remaining, triggering a second instance of the bonus game during play of the basic game, and providing any stored remaining award opportunities during play of the second instance of the bonus game.

According to yet another aspect of the invention, computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1:
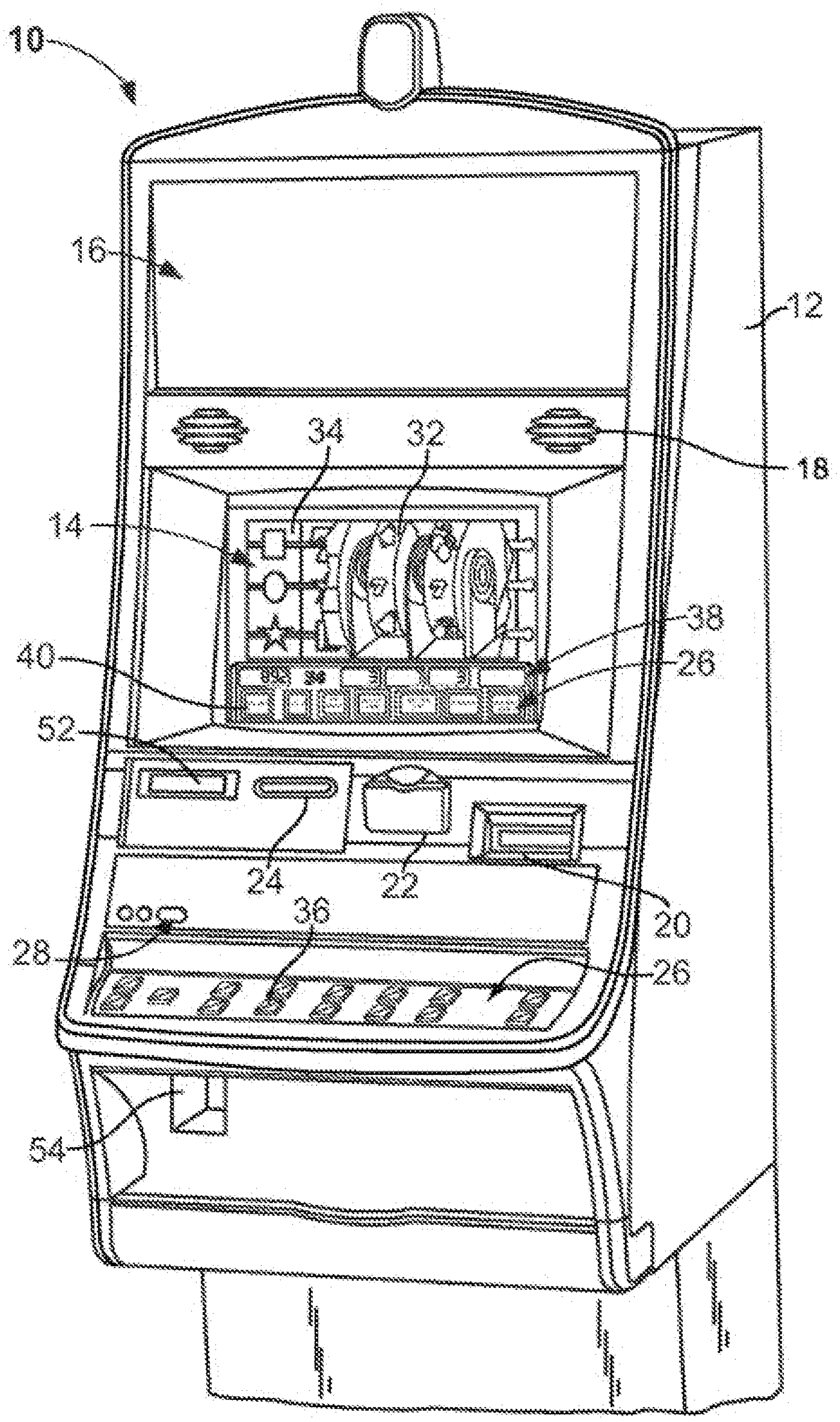
FIG. 1 PRIOR ART
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
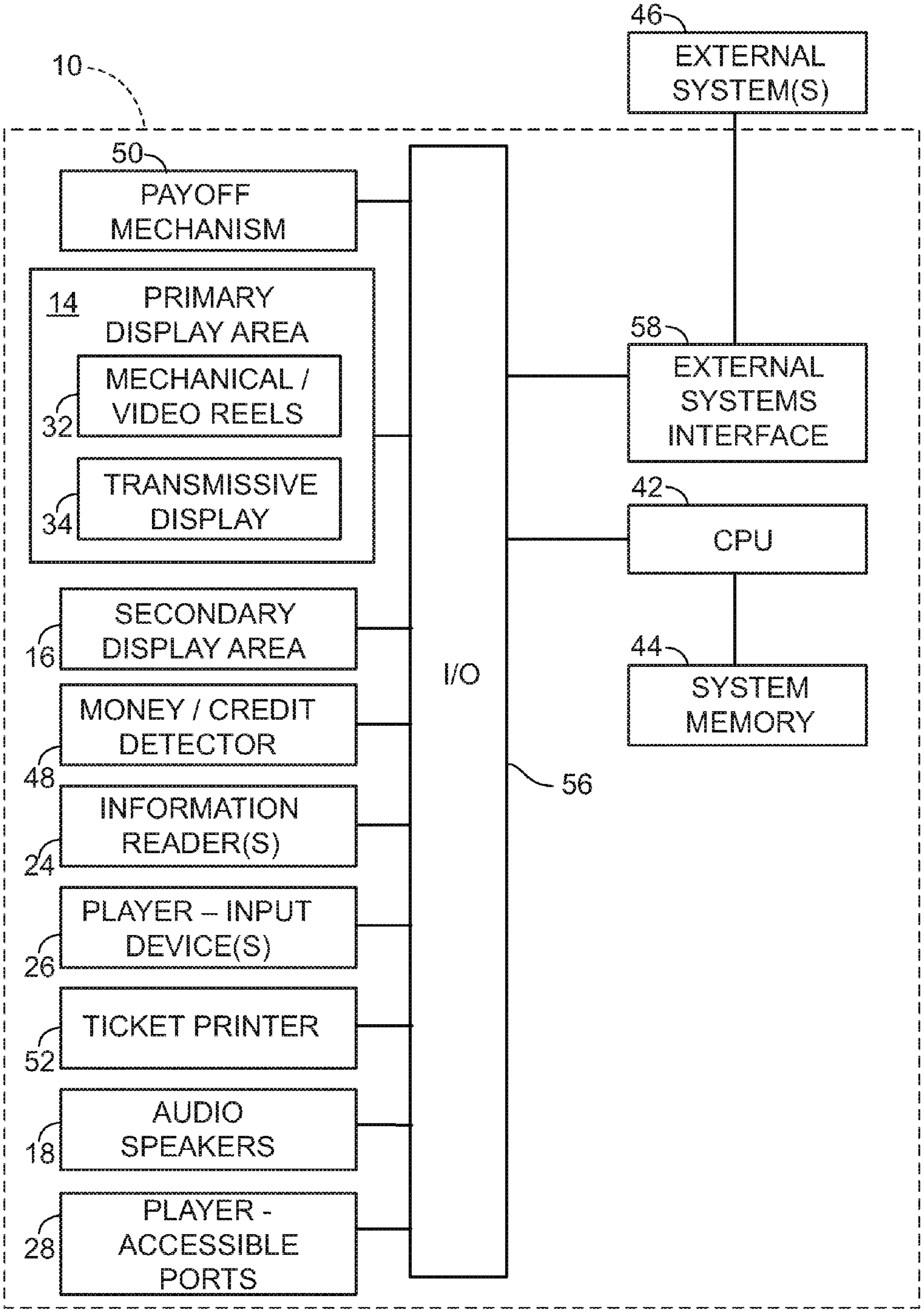
FIG. 2 PRIOR ART
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
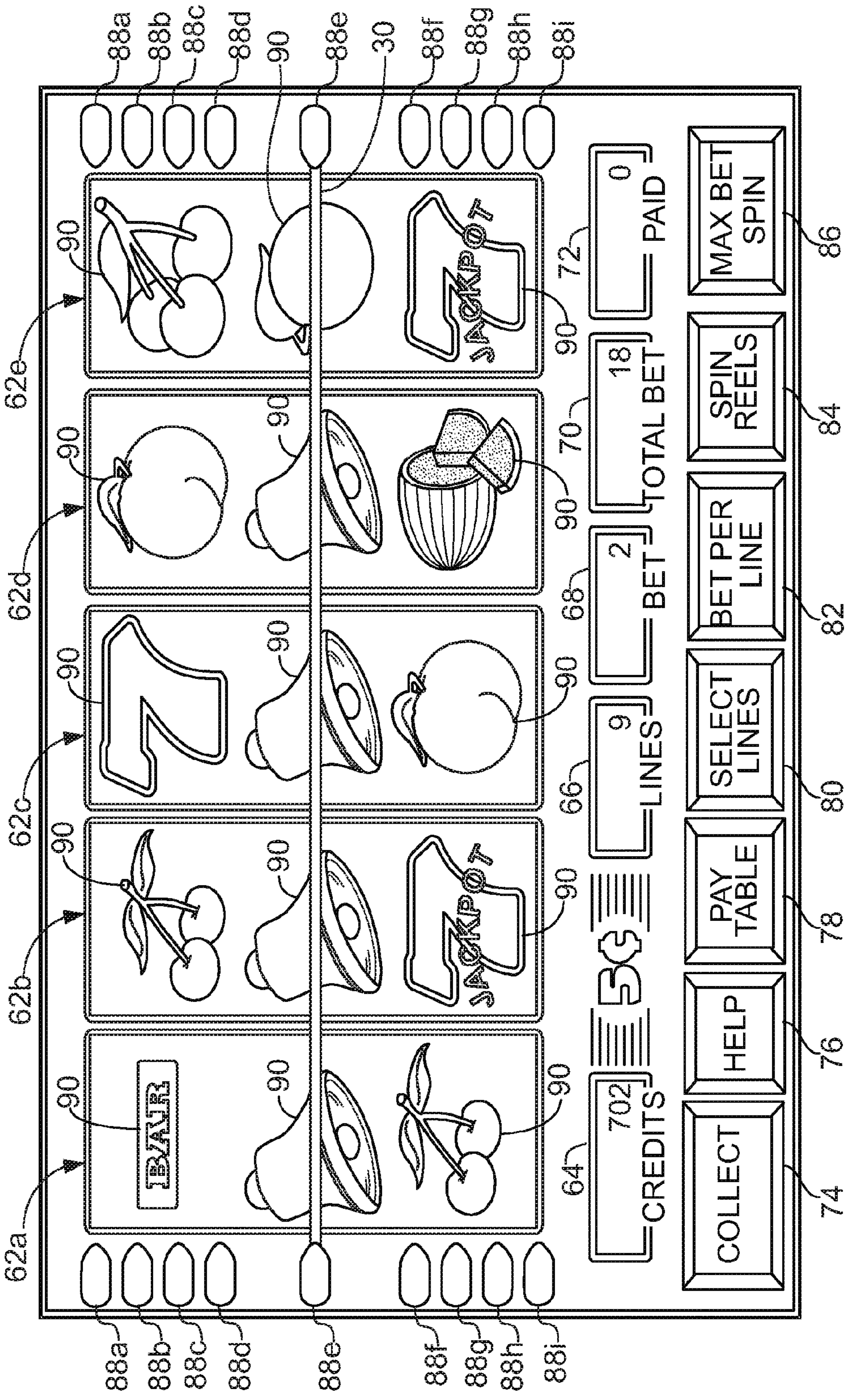
FIG. 3 PRIOR ART
FIG. 3 is an image of an exemplary basic-game screen of a wagering game displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88a-i on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4:
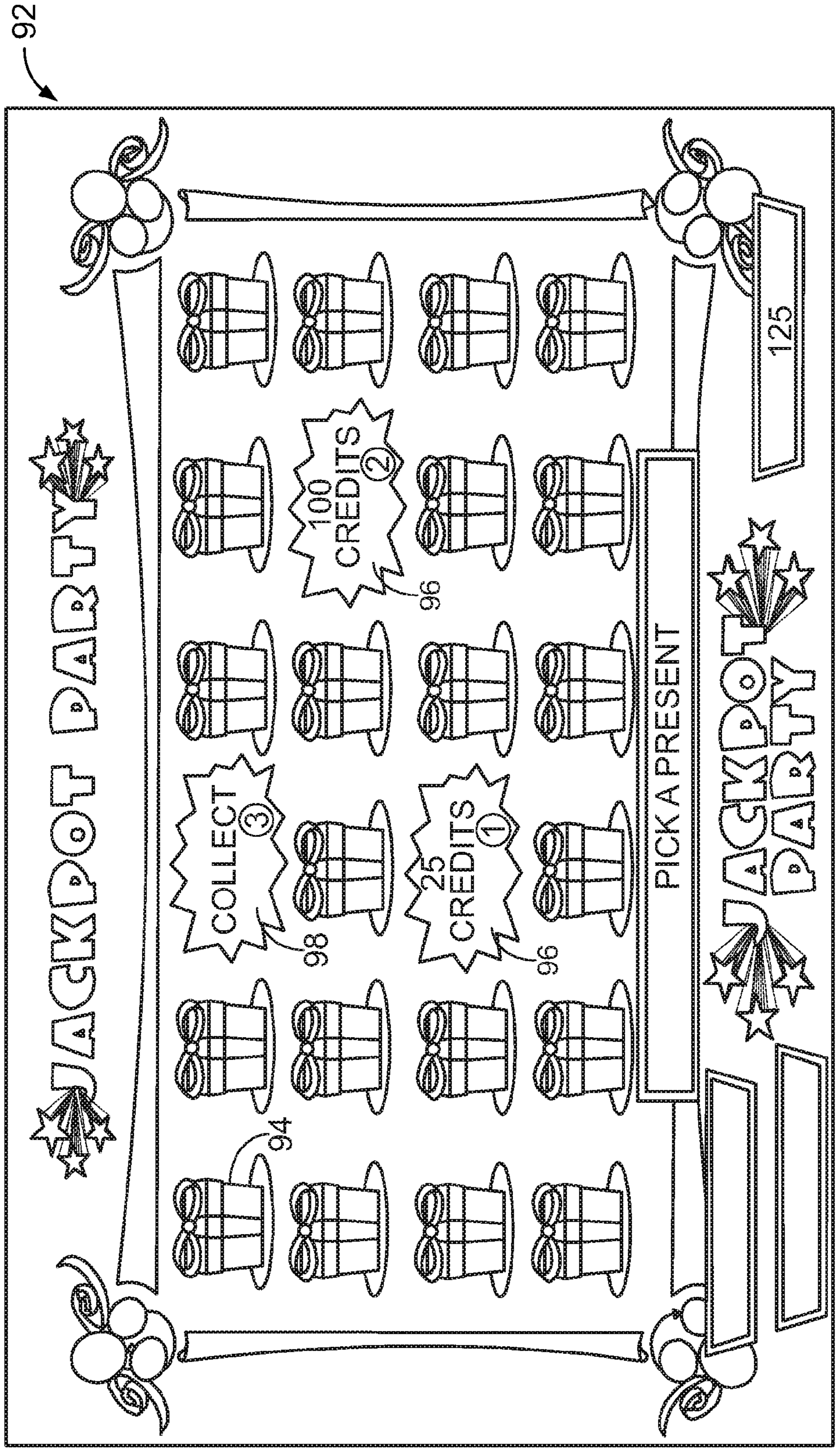
FIG.4 PRIOR ART
FIG. 4 is an image of a bonus-game screen of an exemplary wagering game displayed on a gaming terminal, according to an embodiment of the present invention.

Turning now to FIG. 4, an example of a bonus game to a basic wagering game is illustrated. A bonus-game screen 92 includes a pick-field having an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

According to the embodiments described herein, award opportunities (e.g., selections, spins, non-monetary valued awards, combinations thereof or the like) of a first secondary event or bonus game may be carried over or deferred to one or more subsequent secondary events or bonus games. Referring back to FIG. 4, for example, the bonus game may be such that a player may select from the array of markers 94 a predetermined amount of times (e.g., five times) or until an end-game outcome 98 is achieved. The end-game outcome 98 may include selecting a marker 94 associated with a top award, a terminator, a mini-bonus, etc. If the player selects the end-game outcome 98 prior to all of the predetermined amount of selections being made, the remaining selections may be deferred and carried over to a subsequent bonus game. Thus, if the player selects a terminator on, e.g., the third (of five) selections, the remaining two selections may be applied the next time the bonus game is triggered so that, in the next bonus game, the player will have seven (a predetermined five plus the carried-over two) selections.

In one embodiment, a bonus game may include one or more positive end-game outcomes and one or more negative end-game outcomes. A positive end-game outcome, such as a top award, achieved by the player ends the bonus game and carries over remaining award opportunities. A negative end-game outcome, such as a terminator, simply ends the bonus game and effectively discards any remaining award opportunities.

The type(s) of carried-over award opportunities may vary, depending on the type of bonus game being played. For example, if the bonus game is a reel-based game in which a player is given a predetermined amount of spins to achieve a goal, remaining spins may be carried over to the next bonus game. Thus, although the embodiments provided herein are described with respect to a particular type of bonus game (e.g., pick-field-based, reel-based, or the like), it is to be understood that the embodiments may likewise apply to other suitable types of bonus games. It is contemplated that other suitable items, features, and/or award opportunities may also or alternatively be carried-over from bonus game to bonus game.

Figure 5:
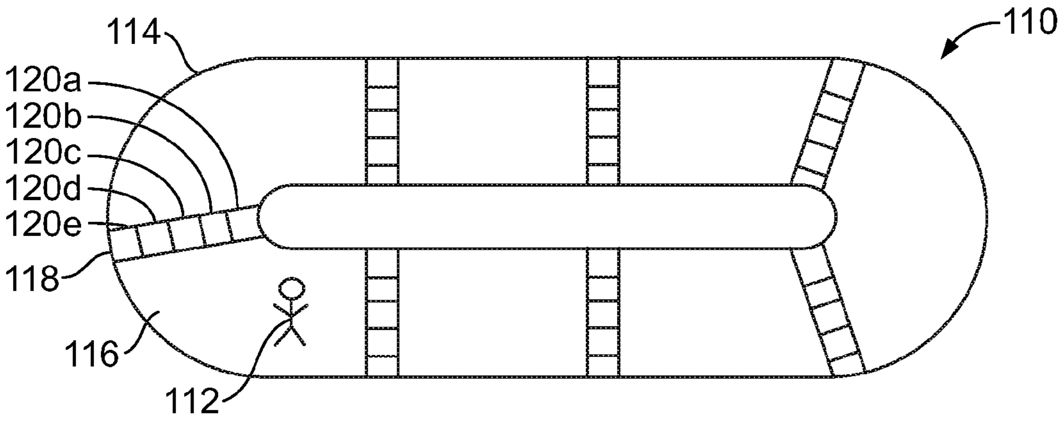
FIG. 5 is an image of a bonus-game screen according to another embodiment of the present invention.

For example, referring to FIG. 5, a bonus game 110 is shown according to another embodiment of the present invention. The bonus game 110 of FIG. 5 illustrates a FIG. 112 traveling around a path 114 at a constant pace. The path 114 is divided into seven sub-paths 116, each of which take the same amount of time for the FIG. 112 to travel across. The sub-paths 116 are separated from one another by walls 118. Each of the walls 118 includes five selection panels 120*a-e* through which the FIG. 112 may pass to enter the next sub-path 116. Each of the walls 118 may include a "key" or other award associated with one of the selection panels 120*a-e*. Although the player cannot control the rate at which the FIG. 112 moves along the path 114, the player can control which of the selection panels 120*a-e* the FIG. 112 passes through at each respective wall 118. According to one embodiment, the player may be given thirty seconds during which time the FIG. 112 may move around the path 114 to find a key in one of the selection panels 120*a-e* of one of the walls 118. If the player finds the key after the fifteenth second, then the fifteen remaining seconds may be transferred to the next bonus game. Thus, assuming that it takes five seconds for the FIG. 112 to move across a sub-path 116 from one wall 118 to the next, adding the remaining fifteen seconds to the next bonus game would guarantee the player an additional three opportunities to find the key. Thus, although a set number of additional award opportunities are carried over, the player perceives the carry-over item as being in the form of additional time.

According to another embodiment, award opportunities that may be carried over or deferred from one bonus game to the next include opportunities to unlock or to be awarded different types of non-monetary valued content. Such non-monetary-valued content may include "player's-life points" in which a player's avatar, the way the player's game is displayed, video and/or audio associated with the game, or the like is enhanced based on the amount of points achieved. Other examples of non-monetary valued content include non-monetary prizes, complementary items, etc. In one example, a player playing a first bonus game may receive player's-life points at the moment they are achieved, or the player may defer the player's-life points to the next bonus game where the value of the player's-life points may be enhanced (e.g., worth five times more). Carrying over non-monetary valued content may be desirable for encouraging a player to remain at a particular gaming system for extended periods of time without having to pay out greater monetary awards.

Extra time (e.g., in a pick-field type of bonus game) may also be carried over in embodiments where the bonus award or award opportunity is non-monetary. Because the awards are non-monetary (as opposed to, e.g., cash awards), it is possible to vary the expected value (EV) from bonus game to bonus game. Thus, if a player is given thirty seconds to select from the array of markers 94 of the bonus game of FIG. 4 and the player selects an end-game outcome after playing for twenty seconds, the remaining ten seconds may be carried over and used during the next bonus game. Thus, in the next bonus game, the player will have forty (a predetermined thirty plus carried-over ten) seconds to select from the array of markers 94, thereby increasing the player's opportunity to achieve more and/or greater non-monetary awards in the next bonus game.

Alternatively or additionally, the amount of non-monetary valued content awarded to a player may be skill-based. For example, if, during a bonus game, a task is completed before the allotted time in the bonus game is spent (e.g., a player shoots a target and receives an award of fifty player's-life points after ten of a given thirty seconds pass), the remaining time (twenty seconds) may be added to the next bonus game.

There are several advantages associated with allowing a player to carry over award opportunities from one bonus game to another bonus game. For example, if a player achieves a top award before all of his or her selections or spins have been spent in a first bonus game, the player will not feel that he or she is wasting any value or opportunities. Thus, a player who achieves a top award early on in the bonus game (such that unspent award opportunities remain) experiences two levels of excitement: (1) excitement that a top award was achieved in the first bonus game; and (2) excitement that, because the remaining award opportunities are being carried over, the player will have a greater chance of achieving another top award during the subsequent bonus game. Thus, carrying over award opportunities from bonus to bonus further incentivizes the player to achieve the top award and to achieve it early. Carrying over award opportunities from bonus to bonus also incentivizes a player to remain at the gaming terminal and trigger a subsequent bonus game to utilize the carried-over award opportunities to achieve a top award in the subsequent bonus game.

The carryover of award opportunities from bonus game to bonus game may be automatic or player-initiated. Thus, if a player is in the middle of a free-spin bonus game, the player can choose to stop playing the present bonus game and save the remaining free spins by carrying them over to the next bonus game. This may be desirable, for example, if the player has achieved a top award in the bonus game with spins or selections remaining so that, by carrying the remaining spins or selections over to the next bonus game, the player may increase his or her chance of obtaining a second top award during the next bonus game. In another example, if the player is playing a bonus game having a thirty-marker pick-field and has five guaranteed selections, the player may choose to defer selections until he accumulates thirty selections (in the sixth bonus game), at which time the player would be guaranteed to be awarded all of the awards associated with all thirty of the markers, including the top award.

A player may also choose to defer or carry over award opportunities if, for example, the top award in subsequent bonus games is unknown and may vary from bonus to bonus (e.g., if there is a possibility that the top award will be higher in subsequent bonus games). For example, the player may decide to carry over award opportunities in hopes that the top award in the subsequent bonus will be higher than the top award of the present bonus (providing a "wager within a wager" gaming experience). The option of adding such strategy to a player's game may be desirable to enhance the player's gaming experience.

It is also contemplated that a player must achieve a certain threshold during a first bonus game in order to defer or carry over award opportunities to a subsequent bonus game. In one example, each time a player achieves an award equal to or above five times the player's initial bet (to play the wagering game) during the first bonus game, the player may be awarded a free selection or spin in a subsequent bonus game. Thus, if a player had ten spins in the first bonus game and achieved an award of over five times the player's initial bet in all ten spins, the player receives ten additional, "carried-over" spins in the subsequent bonus game. In another embodiment, if a player achieves an average award of, e.g., at least five times the player's initial bet over the ten spins of the first bonus game, the player may be awarded additional spins in the subsequent bonus game.

In yet another embodiment, non-winning award opportunities of a first bonus game may be carried over to a subsequent bonus game. For example, if, in a bonus game including a thirty-marker pick-field, a player does not select a marker associated with a top award in a given five selections, those non-winning five selections may be carried over to the pick-field of the next bonus game such that the player would have ten selections in the next bonus game. In one example, if the player completes four successive bonus games in which he or she does not select the marker corresponding with the top award in the pick-field, the "non-winning" selections from each of those four bonus games are carried over to the fifth bonus game, resulting in a total of twenty five selections in a thirty-marker pick-field for the fifth bonus game. If, in those twenty five selections, the player still does not select the marker associated with the top award, the player may be awarded an even larger award (e.g., a progressive award). Thus, during the fifth bonus game, the player's mentality shifts from wanting to select the marker associated with the top award to wanting to avoid selecting that marker, thereby creating a new type of gaming experience.

In another embodiment, rather than collect an award or award opportunity during a bonus game, the player may choose to carry-over the award or award opportunity and essentially wager it for a higher award or award opportunity. In a progressive game, for example, the player may defer a progressive award achieved during a bonus game to a next level of a progressive game. In one embodiment, deferring the progressive award removes the lowest progressive award from the possible progressive awards to be awarded such that the player is only eligible to win the larger progressive awards the next time a progressive award is achieved. The player is not, however, guaranteed to win the larger progressive award. In another example, if a player is awarded a progressive award, the player may defer remaining selections or spins—or even the progressive award itself—to the next bonus game while waiting for the progressive jackpot to increase.

The embodiments described herein may also be applied to companion play in which game-play of one or more players is linked. For example, if the game-plays of Player 1 and Player 2 are linked and Player 1 achieves an end-game outcome (e.g., a top award) before the set amount of selections or spins of the bonus game is used, the remaining selections or spins may be transferred to Player 1's companion, Player 2. Player 2 could then retrigger a carry-over of selections or spins to Player 1 by achieving an end-game outcome before the set amount of selections or spins is spent. This cycle may continue until an end-game outcome is not achieved prior to using all of the given selections or spins or for a predetermined amount of times. In some embodiments, the awards achieved during the bonus games may be awarded to both players, regardless of which player actually achieved the award.

It is contemplated that award opportunities may be carried over from one bonus game to a subsequent bonus game(s) in any suitable type of game including, but not limited to, pick-field and reel-based games as described above, poker games, dice games, or the like. For instance, if, in a first bonus game, a player is provided five initial poker hands to achieve a goal (e.g., Jacks or better) and the player achieves that goal during the third hand, the remaining two hands may be carried over to the next bonus game. Thus, in the next bonus game, the player would be given seven hands or opportunities to achieve the goal. In another example, a player receives an initial ten hands during a first bonus game. The player then receives a draw that is to be propagated through all ten hands. If the player receives a bad draw, the player may defer the remaining nine hands to the next bonus game such that he or she would have nineteen hands during the next bonus game. In yet another example, if a player is allowed to draw three cards in a bonus game but only chooses to draw two, the player may defer the extra draw to the next bonus game such that, in the next bonus game, the player will be permitted to draw four cards, as opposed to the standard three.

In other embodiments, the expected value (EV) may be transferred from bonus game to bonus game. In the BATTLESHIP® bonus game, for example, if a player makes five selections quickly without waiting for any "hints" (e.g., to see if a ship has been hit), the game was played without skill or strategy and, thus, the EV advantage was lost for the first bonus game. This "lost" EV may then be transferred to the next bonus game, thereby increasing the EV of the next bonus game, for example, by providing the player with additional selections in a subsequent bonus game.

In one embodiment, the award opportunities carried over to a subsequent bonus game are more valuable (e.g., include enhanced opportunities or values) than the award opportunities of the first bonus game. For instance, carried-over selections or spins may include more multipliers, wilds, combinations thereof, or the like. In one example, if a player defers three spins from a first bonus game, the player receives three times as many spins (i.e., nine spins) in the next bonus game.

In another example, in response to the player achieving a large award during the first bonus game, the player receives a "bonus" carry-over to a subsequent game in which more than the remaining, unspent award opportunities are carried over to the subsequent bonus game. Thus, if a player achieved a high award and/or achieved it quickly during the first bonus game, the player may be provided with an even greater award opportunity during the next bonus game. Furthermore, because the player is being given something that has definite value but can only be redeemed in a subsequent bonus, the player is incentivized to remain at the gaming terminal for the subsequent bonus game.

In another embodiment, an award achieved during a first bonus game may not be applied until a second bonus game. For example, a player may select a marker corresponding with a “five bonus selections” award from a pick-field (see FIG. 4) of a first bonus game. The five bonus selections, however, may not be awarded to the player until the subsequent bonus game, where those five bonus selections will be added to the set amount of selections provided during the subsequent bonus game. Thus, the selections themselves are not actually carried over from the first bonus game, since they were initially-provided selections during the first bonus game. Rather, an award of extra, bonus selections was carried over because of the selection of the five-bonus-selections award. Other types of awards that may be deferred or carried over include multipliers, free spins, wilds, combinations thereof, or the like.

If a player achieves a predetermined amount of carried-over items, the player may trade those accumulated carried-over items for another type of award. Such other types of awards may include, for example, unlocking a bonus game with higher top awards, receiving a predetermined amount of credits or a particular type of player’s-life enhancement, or the like.

According to the embodiments described herein, if a player decides to cash out prior to playing out his or her carried-over award opportunities, the gaming terminal may pay out for the carried-over non-winning award opportunities. For example, each carried-over award opportunity may be associated with a fixed award amount or an expected value, which would then be paid out to the player. Alternatively, the gaming system may force the player to play out the carried-over award opportunities before allowing the player to cash out (e.g., initiate carried-over free spins and provide the player any award resulting from those free spins). Alternatively, a player that cashes out may lose the opportunity to utilize the carried-over items. In some embodiments, the carried-over items are lost completely, whereas, in others the carried-over items remain on the gaming terminal for the next player to utilize when a bonus event is triggered.

It is contemplated that there may be a set limit on the number of times award opportunities may be carried over. In an embodiment in which non-winning spins may be carried over, for example, if a player carried over two spins from a previous bonus game, the player may play the two spins first during the subsequent bonus game and then play the set amount of spins (e.g., ten spins) provided during the subsequent bonus game. Only the non-winning spins of the “new” ten spins of the subsequent bonus game may then be carried over to a third bonus game.

In another embodiment, award opportunities from one bonus game may be carried over to an entirely different bonus game, e.g., on another gaming terminal. For example, a player may be required to trigger a certain event or reach a certain threshold to trigger a bonus game on a first gaming terminal. Then, to activate the carried-over items in a second bonus game on a second gaming terminal, the player would have to re-trigger the event or reach the threshold again.

Figure 6:
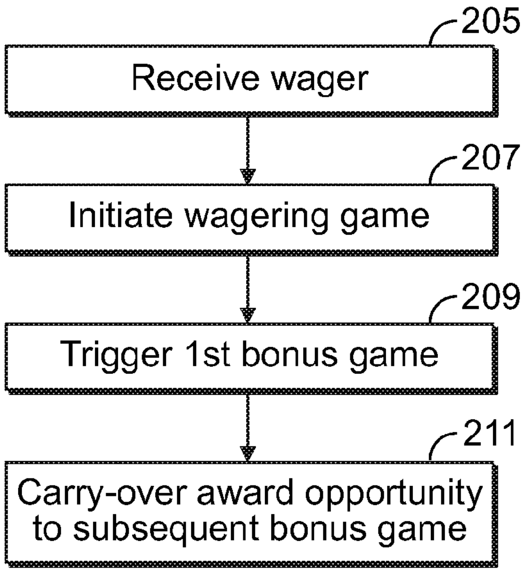
FIG. 6 is a flowchart for an algorithm that corresponds to instructions executed by a controller in accord with at least some aspects of the disclosed concepts.

FIG. 6, described by way of example above, represents one algorithm that corresponds to at least some instructions executed by the controller 42 and/or external systems 46 in FIG. 2 to perform the above described functions associated with the disclosed concepts. By way of non-limiting example, the exemplary algorithm 200 of FIG. 6 includes, at block 205, a wager being placed or otherwise confirmed (e.g., via bill validator 20, coin acceptor 22, information reader 24, or other input device), where play of the wagering game is initiated at block 207. At block 209, a first bonus game having more than one award opportunity is displayed. At block 211, at least one of the award opportunities of the first bonus game is carried over to a subsequent bonus game in response to a predetermined event.

In some embodiments, the method includes at least those steps enumerated above and shown in FIG. 6. It is also within the scope and spirit of the present invention to omit steps, include additional steps, and/or modify the order presented above. It should be further noted that the method represents a single change in appearance. However, it is expected, as indicated above, that the method be applied in a systematic and repetitive manner.

Each of these embodiments and obvious variations thereof is contemplated as falling within the spirit and scope of the claimed invention, which is set forth in the following claims.

What is claimed is:

1. A gaming system comprising:

at least one input device;

at least one display device;

at least one processor; and at least one memory device that stores a plurality of instructions which, when executed by the at least one processor, cause the at least one processor to operate with the at least one display device and the at least one input device to display a wagering game having a basic game and a bonus game, the bonus game having a randomly determined outcome including at least two of a winning outcome, a non-winning outcome, and a first end-game outcome, trigger a first instance of the bonus game during play of the basic game, provide a first number of award opportunities during play of the first instance of the bonus game, complete the first instance of the bonus game in response to the first end-game outcome, store any remaining award opportunities in the at least one memory device in response to the first end-game outcome being achieved with at least one award opportunity remaining, trigger a second instance of the bonus game during play of the basic game, and provide any stored remaining award opportunities during play of the second instance of the bonus game.

2. The gaming system of claim 1, wherein the first number of award opportunities are selections to be utilized in a pick field.

3. The gaming system of claim 2, wherein the first end-game outcome is the selection of a terminator.

4. The gaming system of claim 2, wherein the first end-game outcome is one of a top award and a terminator.

5. The gaming system of claim 1, wherein the award opportunities are reel spins.

6. The gaming system of claim 1, wherein the award opportunities are associated with non-monetary-value awards.

7. The gaming system of claim 1, wherein each of the stored award opportunities is more valuable, on average, when utilized in the second instance of the bonus game than award opportunities utilized in the first instance of the bonus game.

8. The gaming system of claim 1, wherein the bonus game further includes a second end-game outcome different from the first end-game outcome, wherein the at least one memory device further stores an instruction to terminate play of the first instance of the bonus game in response to the second end-game outcome, the termination of the first instance of the bonus game causing any remaining award opportunities to be forfeited.

9. The gaming system of claim 8, wherein the at least one memory device further stores instructions to provide a second number of award opportunities during play of the second instance of the bonus game where the first instance of the bonus game was terminated in response to the second end-game outcome, and provide the second number of award opportunities and any stored remaining award opportunities during play of the second instance of the bonus game where the first instance of the bonus game was completed in response to the first end-game outcome.

10. A computer-implemented method in a gaming system, comprising:

receiving a wager via at least one input device to play a wagering game, the wagering game including a basic game and a bonus game, the bonus game having a randomly determined outcome, the randomly determined outcome including at least two of a winning outcome, a non-winning outcome, and a first end-game outcome;

displaying on at least one display device the basic game and a first and second instance of the bonus game triggered during play of the basic game;

awarding, via one or more processors, a first number of award opportunities during play of the first instance of the bonus game;

completing the first instance of the bonus game in response to the first end-game outcome occurring during the first instance of the bonus game;

storing, utilizing at least one memory device, any remaining award opportunities in response to the first end-game outcome being achieved with at least one award opportunity remaining; and providing any stored remaining award opportunities during play of the second instance of the bonus game.

11. The computer-implemented method of claim 10, wherein each of the stored award opportunities is more valuable, on average, when provided in the second instance of the bonus game than when initially awarded during the first instance of the bonus game.

12. The computer-implemented method of claim 10, wherein the bonus game further includes a second end-game outcome different from the first end-game outcome.

13. The computer-implemented method of claim 12, further comprising terminating play of the first instance of the bonus game in response to the second end-game outcome occurring, the termination of the first instance of the bonus game causing any remaining award opportunities to be forfeited.

14. The computer-implemented method of claim 13, further comprising:

awarding a second number of award opportunities during play of the second instance of the bonus game where the first instance of the bonus game was terminated in response to the second end-game outcome, and awarding the second number of award opportunities and providing any stored remaining award opportunities during play of the second instance of the bonus game where the first instance of the bonus game was completed in response to the first end-game outcome.

15. The computer-implemented method of claim 12, wherein the first number of award opportunities are selections to be utilized in a pick field.

16. The computer-implemented method of claim 15, wherein the first end-game outcome is the selection of a top award.

17. The computer-implemented method of claim 15, wherein the second end-game outcome is one of a top award and a terminator.

18. The computer-implemented method of claim 10, wherein the award opportunities are reel spins.

19. The computer-implemented method of claim 10, wherein the first number of award opportunities are selections to be utilized in a pick field.

20. One or more machine-readable non-transitory storage media including instructions which, when executed by one or more processors, cause the one or more processors to perform operations comprising:

displaying a wagering game having a basic game and a bonus game, the bonus game having a randomly determined outcome including at least two of a winning outcome, a non-winning outcome, and an end-game outcome;

triggering a first instance of the bonus game during play of the basic game;

providing a first number of award opportunities during play of the first instance of the bonus game;

completing the first instance of the bonus game in response to the end-game outcome;

storing any remaining award opportunities in response to the end-game outcome being achieved with at least one award opportunity remaining;

triggering a second instance of the bonus game during play of the basic game; and providing any stored remaining award opportunities during play of the second instance of the bonus game.

* * * * *